US012510508B2

(12) United States Patent
Pradeep et al.

(10) Patent No.: US 12,510,508 B2
(45) Date of Patent: Dec. 30, 2025

(54) POINT-OF-CARE (POC) AMPEROMETRIC DEVICE FOR SELECTIVE ARSENIC SENSING

(71) Applicant: INDIAN INSTITUTE OF TECHNOLOGY MADRAS (IIT MADRAS), Chennai (IN)

(72) Inventors: Thalappil Pradeep, Chennai (IN); Sourav Kanti Jana, Chennai (IN); Kamalesh Chaudhari, Chennai (IN); Md Rabiul Islam, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 375 days.

(21) Appl. No.: 18/008,165

(22) PCT Filed: May 21, 2021

(86) PCT No.: PCT/IN2021/050496
§ 371 (c)(1),
(2) Date: Dec. 3, 2022

(87) PCT Pub. No.: WO2021/245689
PCT Pub. Date: Dec. 9, 2021

(65) Prior Publication Data
US 2023/0273151 A1 Aug. 31, 2023

(30) Foreign Application Priority Data

Jun. 5, 2020 (IN) .............................. 202041023576

(51) Int. Cl.
*G01N 27/416* (2006.01)
*G01N 27/30* (2006.01)
*G01N 33/18* (2006.01)

(52) U.S. Cl.
CPC ....... *G01N 27/4161* (2013.01); *G01N 27/307* (2013.01); *G01N 27/308* (2013.01); *G01N 33/1813* (2013.01)

(58) Field of Classification Search
CPC ............ G01N 27/4161; G01N 27/307; G01N 27/308; G01N 33/1813
See application file for complete search history.

(56) References Cited

U.S. PATENT DOCUMENTS

2017/0363572 A1 12/2017 Gunasekaran

OTHER PUBLICATIONS

Hamsawahini et al., "A sensitive, selective and rapid determination of lead(II) ions in real-life samples using an electrochemically reduced graphene oxide-graphite reinforced carbon electrode," Talanta 144 (2015) 969-976 (Year: 2015).*

(Continued)

*Primary Examiner* — Alexander S Noguerola
(74) *Attorney, Agent, or Firm* — Pilloff Passino & Cosenza LLP; Rachel Pilloff; Sean Passino (57) ABSTRACT

The present invention relates to a new device for selective arsenic sensing using electrochemically reduced graphene oxide (ERGO) based reusable flexible electrode strip. Active electrode of the device was prepared by a very simple method in which the thin film of graphene oxide (GO) was reduced electrochemically at a low DC potential (0 to −1.5 V). The said device selectively detects $As^{3+}$ in field water sample within a wide range of concentrations with a limit of detection of less than 25 ppb. More importantly, the selectivity of the electrode is independent of conductivity and TDS levels of measured field water samples which were collected from various parts of India. Selective detection of $As^{3+}$ by ERGO was controlled by optimizing the surface electronic conductivity through structural modification of it during electroreduction process.

10 Claims, 7 Drawing Sheets

(56) References Cited

OTHER PUBLICATIONS

Chimezie et al., "Fabrication of reduced graphene oxide-magnetic nanocomposite (rGOFe304) as an electrochemical sensor for trace determination of As(III) in water resources," Journal of Electroanalytical Chemistry 796 (2017) 33-42 (Year: 2017).*
A. Hayat, J.L. Marty, Disposable screen-printed electrochemical sensors: tools for environmental monitoring, Sensors 14 (2014) 10432-10453 (Year: 2014).*
Furue Ryo, et al., "Arsine gas sensor based on gold-modified reduced graphene oxide," Sensors and Actuators B: Chemical, (https://dx.doi.org/10.1016/j.snb.2016.08.131), Mar. 2017, vol. 240, pp. 657-663.
PCT/IN2021/050496, Jan. 13, 2022 Later publication of international search report (A3 Feb. 2022).
PCT/IN2021/050496, Dec. 13, 2021 (ISA/210) International Search Report.
PCT/IN2021/050496, Dec. 13, 2021 (ISA/237) Written Opinion of the International Searching Authority.

* cited by examiner

POINT-OF-CARE (POC) AMPEROMETRIC DEVICE FOR SELECTIVE ARSENIC SENSING

FIELD OF THE INVENTION

The present invention relates to a device for selective sensing of arsenic and more particularly a bio-mimic electrode and its method of fabrication for highly selective arsenite ($As^{3+}$) sensing in field water samples using electrochemically reduced graphene oxide (ERGO).

BACKGROUND OF THE INVENTION

Arsenic (As), a notorious natural poison, is now recognized as one of the world's greatest environmental hazards and has threatened the lives of several million people around the globe [Ravenscroft, P. Predicting the Global Extent of Arsenic Pollution of Groundwater and Its Potential Impact on Human Health. *UNICEF*, New York 2007]. There are diverse areas in countries like India, Bangladesh, China, Vietnam, Chile, USA, and Canada, where people have been suffering from As contamination, where As levels are much above the World Health Organization (WHO) provisional guideline value of 10 µg $L^{-1}$ (10 ppb) in drinking water [WHO Guidelines for Drinking-Water Quality. 2011, 315-318, USEPA Technical Factsheet: Final Rule for Arsenic in Drinking Water. 2001, 1-6]. Ingesting groundwater with high concentrations of As for longer periods results the life-threatening effect, such as "blackfoot" disease, atherosclerosis, hypertension, hyperkeratosis and different forms of skin and lung cancers. Therefore, regular monitoring of As contamination in drinking water is an urgent need of the community in As affected areas. To date, many laboratory-based sophisticated analytical methods have been employed for the determination of inorganic As, including inductively-coupled plasma mass spectrometry (ICP-MS) [Yan, X. P.; Kerrich, R.; Hendry, M. J. Anal. Chem. 1998, 70, 4736-4742], fluorescence spectroscopy, [Yin, X. B.; Yan, X. P.; Jiang, Y.; He, X. W. Anal. Chem. 2002, 74, 3720-3725], atomic absorption spectroscopy [Aggett, J.; Aspell, A. C. Analyst 1976, 101, 341-347], electrospray ionization MS [Minakata, K.; Nozawa, H.; Yamagishi, I.; Gonmori, K.; Kanno, S.; Kanako, W.; Suzuki, M.; Husein, W.; Ahmed, A., Suzuki, O. Forensic Toxicol 2009, 27, 37-40], and high-performance liquid chromatography (HPLC) [Hirata, S.; Toshimitsu, H.; Aihara, M. Determination of arsenic species in marine samples by HPLC-ICP-MS. Anal Sci., 2006, 22, 39-43]. However, these methods are cost-ineffective and require trained personal and significant resources. Thus, for the people living in rural areas, it is practically not viable to monitor As in drinking water regularly. This constraint is not only because of cost-ineffective methods but also due to the limited accessibility of the measurement facilities. Therefore, development of a portable sensor device, which is based on 'drop and monitor' technology at an affordable price, is highly useful for a common man. Hence, there is a high demand for the development of a point of care (POC) As sensor to solve both technological and social requirements.

However, the total arsenic in real field water exists in two ionic forms, arsenite ($As^{3+}$) and arsenate ($As^{5+}$), among them $As^{3+}$ is more toxic compared to $As^{5+}$ [Masscheleyn, P. H.; Delaune, R. D.; Patrick, W. H. Environ. Sci. Technol., 1991, 25, 1414-1419]. Therefore, quantitative and selective detection of $As^{3+}$ in water is essentially required using a simple affordable device like a commercial glucometer.

Most of the presently available As sensors are exclusively based on anodic stripping voltammetry (ASV) and are limited to the scientific publications. Although the method is promising, however, it has been established mostly using bulk gold electrodes and still faces obstacles for commercialization due to various reasons. First, bulk gold electrodes are not cost-effective and function only in highly acidic medium (such as $H_2SO_4$, $HClO_4$, and $HNO_3$, etc.) during ASV measurements, which can cause problems by producing toxic arsine gas. Second, surface fouling is a common issue which needs to be resolved. Third, $As^{3+}$ sensing by ASV using gold-based electrodes strongly depends on the crystallographic orientation of the electrode, which poses a challenge in the electrode fabrication [Chao, G.; Yu, X. Y.; Xiong, S. Q.; Liu, J. H.; Huang, X. J. Anal. Chem. 2013, 85, 2673-2680]. Furthermore, another drawback of this technique is that it can take longer analysis time (sometimes 15-20 min for $As^{3+}$ deposition). In this context, people around the globe have been working on several nanostructured materials for the development of ASV based arsenic sensors. Chinti et al. have reported $As^{3+}$ detection through ASV using screen-printed electrodes, coated with a nanocomposite which is based on gold nanoparticles and carbon black. They observed high sensitivity for $As^{3+}$ with a limit of detection (LOD) of 0.4 ppb [Cinti, S.; Sara, P.; Moscone, D.; Palleschi, G.; Arduini, F. Electroanalysis, 2014, 26, 931-939]. In another work, Wu et al. reported $MnO_x$/AuNPs modified glassy carbon electrode (GCE) for the detection of $As^{3+}$ i alkaline media [Wu, S.; Zhao, Q.; Zhou, L.; Zhang, Z. Electroanalysis 2014, 26, 1840-1849]. Authors of the same literature claimed that the modified GCE electrode has a highly specific arsenic response in presence of other heavy metal ions also. The proposed modified electrode was successfully applied for the analysis of $As^{3+}$ in tap water samples also. Recently, T. Gupte and S. K. Jana et al. from our group have also reported trace amount of $As^{3+}$ (1 ppb) sensing in phosphate-buffered saline (PBS, pH~7) using electrodeposited MnOx on indium doped tin oxide (ITO) coated glass substrate [Gupte, T.; Jana, S. K.; Mohanty, J. S.; Srikrishnarka, P.; Mukherjee, S.; Ahuja, T.; Sudhakar, C.; Thomas, T.; Pradeep, T. ACS Appl. Mater. Interfaces 2019, 11, 28154-28163]. In another work, V. Subramanian et al. from the same group have developed a radial microfluidic device based on ion concentration polarization (ICP) and integrated it with a photolithographically patterned Au coated glass substrates [Subramanian, V.; Lee, S.; Jena, S.; Jana, S. K.; Ray, D.; Kim, S. J.; Pradeep, T. Sensors and Actuators B: Chemical, 2020, 304, 127340-8.]. They demonstrated $As^{3+}$ detection of 1 ppb in distilled water using such a microfluidic device. Similarly, other transitional metal oxide materials like $Fe_3O_4$, $SnO_2$, $CoO_x$, $IrO_2$, and $TiO_2$, etc. coated conducting electrodes have also been reported for ASV based arsenic sensing [Chao, G.; Yu, X. Y.; Xiong, S. Q.; Liu, J. H.; Huang, X. J. Anal. Chem. 2013, 85, 2673-2680]. Similarly, Yan Liu et al. reported electrodeposition of electroreduced graphene oxide-Au nanoparticles composite film at glassy carbon electrode which was used for the detection of trace amount of arsenic (III) by the same technique. [Liu, Y. et al., Sensors and Actuators B: Chemical, 2013, 188, 894-901]. John H. T. Luong, et al., reported a review on recent advances in new electrode materials for electrocatalytic and electrochemical sensing of arsenic. [Luong, J. H. T.; Lam, E.; Male, K. B., Anal. Methods, 2014, 6 (16), 6157-6169.] The aforementioned ASV based arsenic sensors using either bulk Au or several nanostructured electrodes encounter an interference problem mostly with $Cu^{2+}$ during stripping analysis. Furthermore, ASV technique takes longer analysis time, sometimes 15-20 min for $As^{3+}$ deposition and surface fouling of the electrode in acidic medium is also a common issue which needs to be resolved. In literature, there is no discussion about the ASV measurements using field water samples in which TDS (total dissolved solids) level (500-1000 ppm) is presumably higher compared to $As^{3+}$ concentration present in the same water.

Hence, there is an urgent need to develop a chrono-amperometric (CA) sensor for selective detection of $As^{3+}$ at high signal to noise ratio, low detection time, and most importantly using low-cost nanostructured electrodes. Moreover, CA method has several advantages over ASV method and it is often applied in commercial biosensors. The most important fact is that CA technique requires lesser time (few seconds) as compared to ASV. In CA, certain chemical species are either oxidized or reduced (redox reactions) at the electrode surface at a constant applied potential depending upon the relative position of the Fermi level with respect to the redox potential of the electrolyte [LeBlanc, S. E., Fogler, H. S. AIChE Journal, 1986, 32, 1704-1709].

The objective of the present invention was to develop an arsenic sensor based on CA measurements, which in essence may be referred to as a "drop and monitor" technology. Herein, we used ERGO as an active electrode material for selective detection of $As^{3+}$. In this context, the structural and electronic properties of the ERGO surface were tuned by varying the electrochemical reduction time of graphene oxide (GO) by which it mimicked the characteristics of the enzyme, arsenite oxidase. Taking into account several advantages of CA technique over stripping voltammetry, reusable test strips coated with optimized thin ERGO film were developed for the selective detection of $As^{3+}$, even while there were variations in conductivity and TDS levels in the monitored water samples.

SUMMARY OF THE INVENTION

The present invention relates to a new point-of-care (POC) CA device for the selective detection of $As^{3+}$ in the field water. The CA device comprises a reusable bio-mimic electrode test strips coated with electronically optimized thin ERGO film for the selective detection of $As^{3+}$ in field water.

In one embodiment, the POC CA device of the present invention comprises a reusable bio-mimic electrode test strips made of ERGO grown on a metallic thin film coated flexible polyethylene terephthalate (PET) substrate, where, the electronic property of the ERGO surface was modified through electrochemical reduction of GO by applying a DC potential in the range between 0 to −1.5 V at the electrode for 0 to 8 hours for selective $As^{3+}$ sensing by them. Sensing mechanism involves with adsorption of $As^{3+}$ on the electrode surface which was subsequently electro-oxidized to $As^{5+}$. The said device selectively detects $As^{3+}$ in field water samples upon applying a fixed potential within +0.1 to +0.25 V in a pH range of 7 to 9 and sensitivity of the device is independent of conductivity and TDS levels in the measured water samples.

In other embodiment, the present invention relates to the optimization of electronic property through structural modification of the ERGO surface by varying electrochemical reduction time of GO makes it to mimic the characteristics of arsenite oxidase enzyme. In the first step of ERGO fabrication, as prepared GO solution was drop-casted onto the MESA treated metallic substrate followed by vacuum drying for 1-6 h. Finally, electro-reduction of GO film was performed at 0 to −1.5V with PBS which was used as an electrolyte during the reduction process.

In another embodiment, the present invention illustrates a CA method for detecting the presence of $As^{3+}$ in field water samples using a reusable electrode test strips. These reusable electrode test strips were made of electronically optimized ERGO grown on metallic test strips. CA measurement was performed using ERGO strips in presence of $As^{3+}$ in both PBS and field water samples with different ionic conductivity within a potential range between +0.02 to +0.12 V and +0.1 to +0.25 V, respectively. CA measurement showed that the ERGO strips had a highly selective response for $As^{3+}$ despite the presence of other heavy metal ions ($As^{5+}$, $Cu^{2+}$, $Fe^{2+}$, and $Mn^{2+}$) of 1 ppm. Moreover, the sensitivity of the electrode strips was not deteriorated, even after repeated use and after subjecting them to adverse conditions such as high temperature (45° C.) and humid conditions (80% RH) also.

In other embodiment, the present invention relates to the selective adsorption of $As^{3+}$ onto the active sites of the ERGO surface and oxidation of adsorbed $As^{3+}$ occurred subsequently upon application of external DC potential. Surface defects on $sp^2$ carbons of the basal plane of monolayer ERGO act as active sites for $As^{3+}$ adsorption. During the potential sweep (negative to positive), $As^{3+}$ species, which were adsorbed at the electrode surface, were oxidized and oxidized species came into the solution.

BRIEF DESCRIPTION OF THE DRAWINGS

FIG. 4 (A) CA response of ERGO3 with 1 ppm $As^{3+}$ in PBS (PH~7) with respect to the response current of PBS alone. The experiment was performed after electrochemical stabilization of ERGO3 coated strips through continuous CA scans in PBS. Each CA spectrum was fitted with a tri-exponential decay function and each data point was selected at 25 s of CA measurement. Inset figure shows CA response of bare metal strip with different heavy metal ions. (B) Interference study performed with several heavy metal ions with ERGO6 electrode. Concentration of $As^{3+}$ was fixed with 200 ppb, while 1 ppm was maintained for interfering ions. (C) Repetitive CA measurements with different concentrations of $As^{3+}$, which demonstrates the reproducibility of the linear current response to different As³⁺ concentrations, (D) measurement of a calibration curve to determine the LOD in PBS.

FIG. 5 (A) Investigation of CA current response of 1 ppm $As^{3+}$ spiked in PBS with different ionic conductivity. (B) Repetitive CA current response of ERGO3 with different field samples (marked as F1-F10) which have different conductivity and TDS levels. CA response of various field samples (no As was found) with different TDS and conductivity. Initial three cycles represent the current response of $As^{3+}$ in PBS, while every three sets of the rest of the cycles represent the current response of the electrode with a particular field sample having no $As^{3+}$. We tested with ten individual field samples. (C) Variation of different conductivity and TDS of measured field water samples. (D) CA current response of $As^{3+}$ spiked in both PBS and different field samples. First three cycles correspond to the current responses of 1 ppm $As^{3+}$ in PBS followed by current responses in field sample with 1 ppm $As^{3+}$. This experiment was carried out with three different field samples (F1-F3). (E) CV performed with the same ERGO3 electrode with field sample (F1), inset figure shows CV of the same electrode in PBS. (F) Calibration curve obtained from CA measurements performed with different concentrations of $As^{3+}$ (varying from 500 to 5 ppb) spiked in the field sample.

Referring to the drawings, the embodiments of the present invention are further described. The figures are not necessarily drawn to scale, and in some instances, the drawings have been exaggerated or simplified for illustrative purposes only. One of ordinary skill in the art may appreciate the many possible applications and variations of the present invention based on the following examples of possible embodiments of the present invention.

DETAILED DESCRIPTION OF THE INVENTION

The following embodiments have been presented by way of example to describe the spirit of the present invention, and do not limit the scope of the present invention unless otherwise indicated. Also, in the drawings used in the following description, the main sections are enlarged for convenience to clarify the features of the present invention, and the dimensional ratios of the respective components are not necessarily the same as the actual.

The present invention relates to the development of a new POC chronoamperometric device for the selective detection of $As^{3+}$ in the field water. The CA device comprises a reusable bio-mimic electrode test strips coated with optimized thin ERGO film. The fabrication of ERGO thin film was done by time-dependent electro-reduction of GO which was aimed to control their electronic property through structural modification of ERGO film for sensitive and selective detection of $As^{3+}$ in field water.

Synthesis of GO

Typically, GO was synthesized from graphite powder based on the modified Hummer's method. Briefly, graphite powder (1-4 g) was oxidized in a hot solution (50-150° C.) of concentrated $H_2SO_4$ (5-40 mL) containing $K_2S_2O_8$ (1-8 g), and $P_2O_5$ (2-84 g). The resulting dark blue mixture was kept thermally isolated and allowed to cool down to room temperature for 1-10 h. The mixture was diluted to 100-500 mL and the resulting solution was filtered subsequently. Finally, the filtrated product was dried overnight at 40-100° C. in a hot air oven. As synthesized pre-oxidized graphite powder (1-5 g) was further added to 50-150 mL of cold $H_2SO_4$ (0° C.), to which $KMnO_4$ (4-20 g) was gradually added under continuous stirring in ice-bath. After 5-30 min, $NaNO_3$ (1-6 g) was added to the mixture. The solution was further stirred for 1-5 h at 25-50° C. and distilled water (100-500 mL) was added dropwise during stirring. The reaction was stopped after simultaneous addition of a mixture of 100-500 ml distilled water and 5-30 mL of $H_2O_2$ (10-50%) to the previous solution. The final product was washed sequentially with different solvents; at first, with diluted HCl (1:20) and then with water, and at last, the product was suspended in distilled water. The brown dispersion was dialyzed extensively to remove both residual metal ions and acids. Finally, the dispersion was exfoliated via ultrasonication (300 W) for 1-5 h and unexfoliated graphite oxide was further removed by centrifugation (12000 rpm for 20 min using Centrifuge KUBOTA (Tokyo, Japan)).

ERGO Fabrication on the Thin Metallic Film Coated Test Strips

Figure 1:
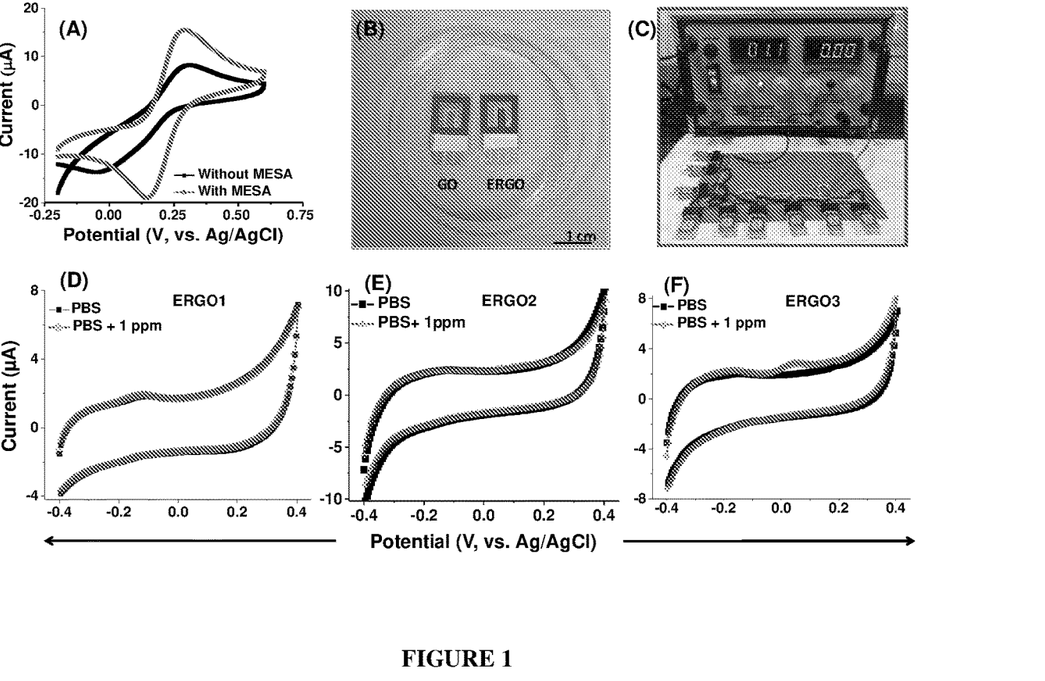
FIG. 1 (A) CV of Au strips in 1 mM ferricyanide solution to study the effect of MESA pretreatment, (B) digital image of pristine GO and ERGO strips, (C) homemade set-up with PCB for multi-electrode preparation, study the $As^{3+}$ response by CV using several ERGO electrodes; (D) ERGO1, (E) ERGO2, and (F) ERGO3.

At first, flexible and patterned thin metallic strips, on which ERGO was fabricated, was pretreated with 1-5 mM of sodium 2-mercaptoethanesulfonate (MESA, $HSCH_2CH_2SO_3Na$). The thin film on the test strip is made of any of the noble metals (Au, Pt, Ag) or their alloys. This metallic film acts as the current collector during electrochemical measurements. For chemical pretreatment, strips were dipped in MESA for 12-100 hours for surface modification. Test strips were rinsed subsequently to remove excess MESA from the test strips, and finally, those were dried with $N_2$ gas. To check the electrochemical activity and interfacial charge transfer of surface-modified metallic surface, we measured CV of the test strips (with and without MESA treatment) with a mixture of 1-4 mM potassium ferricyanide and 50-150 mM KCl. The resulting voltammogram is shown in FIG. 1A, where redox peak potential difference of pretreated test strips is 60-80 mV which ensures a one-electron transfer process at the electrolyte interface. Before starting the ERGO fabrication process on MESA treated metal strip, we prepared 4 to 8 μg/ml of GO suspension from 0.05 to 0.4 mg/ml of stock solution. Later, a mixture was prepared by maintaining a volume ratio of 2:1 with diluted GO and Nafion (1 to 5%), respectively. Subsequently, 1 to 10 μL of GO solution mixture was dropcasted on the working electrode of test strips followed by vacuum drying of them for 1-12 h. Finally, electro-reduction of GO film was performed at 0 to −1.5 V with PBS which was used as an electrolyte during the reduction process. The electro-reduction was carried out for different time durations (1 to 10 h). Herein, we prepared three ERGO electrodes by varying electro-reduction time and those were named as ERGO1, ERGO2 and ERGO3, respectively. Digital images of the GO coated electrode strips before and after electro-reduction are shown in FIG. 1B. For scale-up of electrode preparation, a homemade set-up was developed with a PCB (printed circuit board) using multiple three-electrode adapters through which multiple ERGO coated strips were produced at a time, as shown in FIG. 1C.

The following section describes the fabrication of the electrode and optimization of their response to $As^{3+}$, followed by the investigation on the change in electronic conductivity of ERGO electrodes and their effect on $As^{3+}$ response by electrochemical impedance spectroscopy (EIS). Finally, the sensitivity and selectivity of $As^{5+}$ response and electrochemical stability of the optimized electrode are discussed. All the electrochemical measurements were done at room temperature. Electro-analytical measurements were performed with PalmSens Potentiostat, while EIS was performed with Biologic SP200 Potentiostat/Galvanostat.

FIG. 1A describes voltammogram of bare test strips with (grey curve) and without surface pre-treatment (black curve). The differences between peak potential ($\Delta E_p$~60-80 mV) of the voltammogram ensures a one-electron transfer process between the interface of MESA treated strip and electrolyte. The present invention observed $\Delta E_p$ of about 300 mV for the untreated test strip, while voltammogram of the same strip after MESA treatment shows 60-80 mV. FIG. 1B represents the digital photograph of both GO and ERGO coated metal strips and those were used for further analytical measurements with both CV and CA techniques. Scale bar determines the actual dimension of the electrodes (working, counter, and reference) which were patterned on the test strips. The geometrical surface area of the active working electrode (ERGO) was fixed as 0.25 cm$^2$ and it was same for all the test strips. Before starting any analytical measurements, CV was performed with all ERGO electrodes in PBS (PH~7) using 1 ppm $As^{3+}$ and the corresponding voltammograms are shown in FIG. 1D-1F, respectively. ERGO3 electrode responded exclusively to $As^{3+}$, while other electrodes were inactive for an electrochemical response of $As^{3+}$. The current maxima associated with $As^{3+}$ response is related to oxidation of $As^{3+}$. Therefore, ERGO3 was used further for sensitivity and selectivity measurements. Since ERGO electrodes were developed by electro-reduction of oxygen functional groups of GO and ERGO3 responded to $As^{3+}$ exclusively, there must be an effect of electronic conductivity of the ERGO electrodes on $As^{3+}$ sensing. Thus, EIS was performed to investigate, how electrochemical reduction of oxygen functional groups affected the electronic property of the individual ERGO electrode and made it sensitive to $As^{3+}$.

Figure 2:
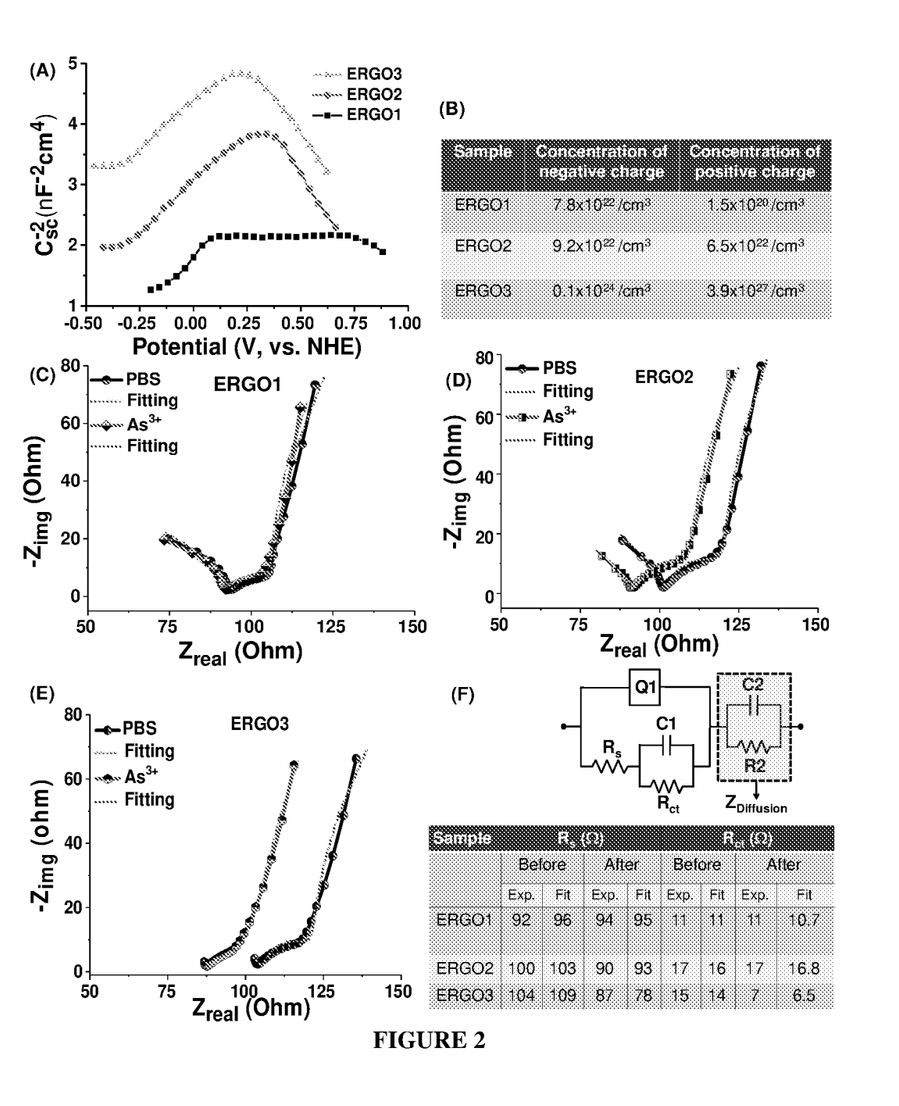
FIG. 2 (A) Mott-Schottky analysis of ERGO samples to determine the surface charge of them. (B) Tabulated form shows a variation of intrinsic charge concentration of different ERGO samples. Electrochemical impedance spectroscopy (EIS) measurement using different ERGO samples with and without $As^{3+}$, (C) ERGO1, (D) ERGO2, and (E) ERGO3. (F) Fitting circuit along with both experimental and fitting data of all the samples.

EIS technique was used as a probe to understand the electronic property of the ERGO surface and its effect on the interfacial charge transport during $As^{3+}$ sensing. Electronic property of the ERGO electrodes (ERGO1, ERGO2, and ERGO3) was investigated by Mott-Schottky analysis, in which reciprocal of the square of capacitance was plotted with applied potential to the ERGO electrode. The Mott-Schottky plot shown in FIG. 2A was deduced by measuring the impedance of the electrode by varying applied DC potential at a given frequency of the AC signal (in our case, it is 1 kHz). The mathematical expression of Mott-Schottky (M-S) plot is represented as in equation 1, which is a linear equation and from the slope of the equation, we determine the density of charge at the electrode. Moreover, both positive slope and negative slope determine the n-type (negative) and p-type (positive) charge at the ERGO electrodes, respectively.

$$\frac{1}{C_{sc}^2} = \pm \frac{2}{\varepsilon_0 \varepsilon_r N_d A^2 e}\left[V - V_{fb} - \frac{KT}{e}\right] \quad (1)$$

Where, $C_{sc}$, $\varepsilon_0$, $\varepsilon_r$, $N_d$, A, e, $V_{fb}$, K, and T are space charge capacitance formed beneath of the surface of ERGO, the dielectric constant of free space, the relative dielectric constant of ERGO, charge density accumulated in ERGO, the geometrical surface area of ERGO, electronic charge, flat band voltage of ERGO, Boltzman constant, and temperature, respectively.

Figure 3:
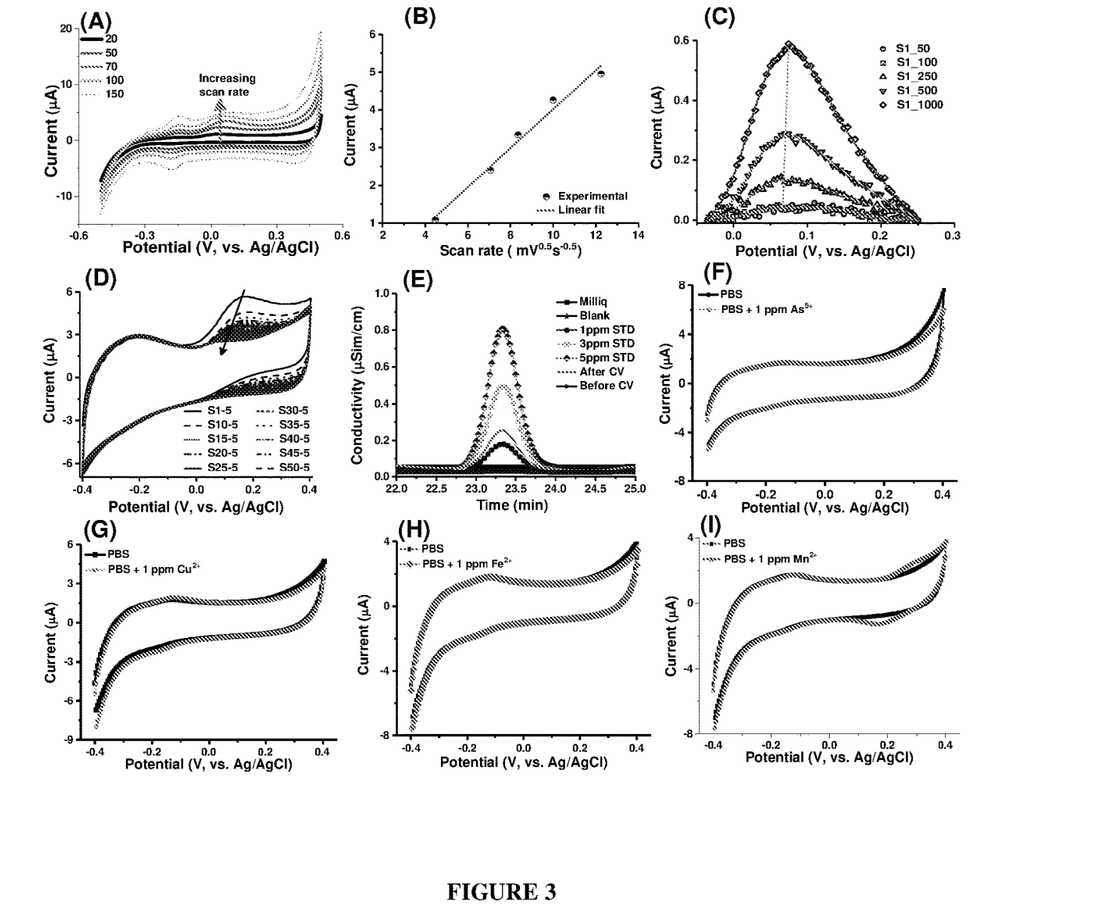
FIG. 3 (A) Scan rate dependent cyclic voltammetry (CV) of ERGO3 using 200 ppb $As^{3+}$ in PBS, (B) variation of peak current with scan rate, (C) Liner sweep voltammetry of the same sample with different concentration of $As^{3+}$ in PBS, (D) continuous CV scans for 50 cycles with ppm of $As^{3+}$ in DI water, (E) chronogram obtained from ion chromatography (IC) 10 measurements with standard (STD) $As^{5+}$ solutions of different concentrations along with the solution obtained after CV cycles, (F)-(I) voltammogram of ERGO3 in presence of different heavy metal ions $As^{5+}$, $Cu^{2+}$, $Fe^{2+}$, and $Mn^{2+}$, respectively.
Figure 4:
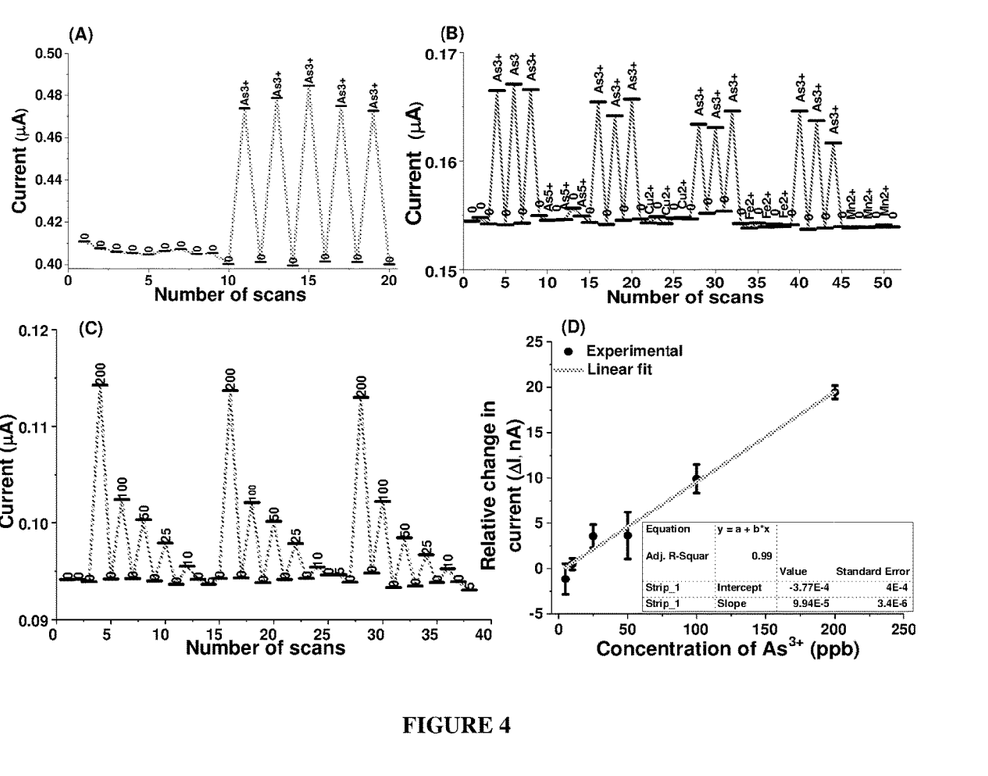

In FIG. 2A, it is seen that there is a variation of both positive and negative slopes simultaneously and increase of positive slope with increase in reduction time of the electrode attributes to the accumulation of positive charges in both ERGO2 and ERGO3, respectively. FIG. 2B represents the tabulated form of both positive and negative charges of all the electrodes. The inverse V shape of the M-S plot decides the existence of both positive and negative charges of the electrodes [Meng, F.; Li, J.; Cushing, S. K.; Zhi, M., Wu, N. J. Am. Chem. Soc. 2013, 135, 10286-10289, 17-18, Li, J.; Meng, F.; Suri, S.; Ding, W.; Huang, F.; Wu, N. Chem. Commun., 2012, 48, 8213-8215]. It is observed that ERGO3 has higher positive and negative charge density compared to all the electrodes, also positive charge density is dominant over negative charge density in ERGO3. This makes ERGO3 to a p-type conducting material. To investigate the effect of the electronic property of the ERGO electrodes on the charge transport property at the electrolyte interface, the total impedance of the electrode was measured by varying the frequency of the AC signal from 1 MHz to 1 mHz at a constant DC potential in between +0.01 to +0.25 V. Variation of imaginary impedance with real impedance at each frequency constitutes the Nyquist plot of the electrode. FIG. 2C-2E represent the Nyquist plots of ERGO1, ERGO2, and ERGO3 before and after addition of $As^{3+}$ to the electrolyte, respectively. Each experimentally obtained Nyquist spectrum was fitted with the impedance spectrum of an electronic circuit shown in FIG. 2F. Each circuit element of the equivalent circuit has its own physical significance to the interfacial charge transfer process. In FIG. 2C-2E, it is seen that each semicircle has two intercepts to the X-axis, first intercept corresponds to the equivalent series resistance ($R_s$) and the second one is the charge transfer resistance ($R_{ct}$). $R_s$ is mostly associated with the combined effect of solution conductivity and bulk electronic property of ERGO. Bulk electronic property is governed by the electron transport from the ERGO surface to the Au substrate through the stacking of multiple ERGO sheets. On the contrary, $R_{ct}$ is related to charge transfer kinetics at the ERGO/electrolyte interface. In FIG. 2C-2E, the change was observed in $R_s$ for all the test strips before and after addition of $As^{3+}$. Before addition of $As^{3+}$ to the electrolyte, an increasing tendency in $R_s$ is observed with increase in electro-reduction time of ERGO samples (ERGO1 to ERGO3). This anomaly is presumably due to the accumulation of positive surface charge at the ERGO surface which increases eventually the space charge capacitances at the interfaces of both metal/ERGO and ERGO/electrolyte. These space charge capacitances increase the $R_s$ subsequently. However, in presence of $As^{3+}$, ERGO1 does not show any change in $R_s$. This is associated with an insufficient concentration of free surface charges, as ERGO1 has lower positive charge density compared to other electrodes, which will facilitate the electrostatic interaction between $H_2AsO_3^-$ moiety and ERGO1 surface. However, enhancement of positive surface charge in both ERGO2 and ERGO3 compared to ERGO1 is sufficient enough to interact with negatively charged moiety. These surface adsorbed species on both ERGO2 and ERGO3 decrease space charge capacitances which lead to decrease in their series resistances further. On the other hand, there is no change of $R_{ct}$ even after exposure of $As^{3+}$ on both ERGO1 and ERGO2, while a significant decrease of $R_{ct}$ in ERGO3 was observed. The significant decrease of $R_{ct}$ implies that charge transfer happens at the ERGO3/electrolyte interface through oxidation of $As^{3+}$. Thus, ERGO3 was considered as an optimized electrode for $As^{3+}$ sensing. Furthermore, sensitive and selective $As^{3+}$ sensing of ERGO3 electrode were investigated through both CV and CA measurements. The results are shown in FIG. 3 and FIG. 4.

FIG. 3A shows the CV performed in $As^{3+}$ solution with different potential scan rates. With slow potential scan rate, the diffusion layer grows much further from the electrode surface in comparison to a faster scan rate. This is attributed to the lower and higher current seen in the voltammogram. For an electrochemically reversible electron transfer processes involving freely diffusing redox species, the Randles-Sevcik equation describes a linear relationship between the peak current $i_p$ (A) with the square root of the scan rate v (V $s^{-1}$). [Elgrishi, N.; Rountree, K. J.; McCarthy, B. D.; Rountree, E. S.; Eisenhart, T. T.; and Dempsey, J. L. J. Chem. Educ. 2018, 95, 197-206]. Thus, to understand the interaction of electrochemical species with the electrode and electron transfer process involved in this interaction, we plotted scan rate dependent peak current ($i_p$ VS. $v^{0.5}$ and $i_p$ VS. v) and corresponding results are shown in FIG. 3B. We observed two distinct phenomena in FIG. 3B and its inset figure. Our results show both linear ($i_p$ VS. $v^{0.5}$) and nonlinear variation ($i_p$ VS. 0) of peak current, which suggests that adsorption of $As^{3+}$ was occurred onto the active sites of the ERGO surface and adsorbed $As^{3+}$ was oxidized subsequently upon application of potential. Surface defects on $sp^2$ carbons of the basal plane of monolayer of ERGO film and the edges of that sheet are the most probable active sites for $As^{3+}$ adsorption. During the potential sweep (negative to positive), $As^{3+}$ species, which were adsorbed at the electrode surface, are oxidized at the same surface and oxidized species came into the solution. Linear sweep voltammetry (LSV) measurements were performed with different concentration of $As^{3+}$, in order to verify that the peak appeared at +0.02 to +0.12V in the voltammogram is the current response corresponding to $As^{3+}$ oxidation exclusively. The voltammogram shown in FIG. 3C attributes to the increasing $As^{3+}$ oxidation current with a gradual increase of $As^{3+}$ concentration. This was verified by the IC measurements. For that, we performed continuous CV scans for 50 cycles (resulting voltammogram shown in FIG. 3D) with 5 ppm of $As^{3+}$ solution prepared in distilled water. Subsequently, IC measurement of the resulting solution was carried out after continuous CV cycles and the chronogram is shown in FIG. 3E. In this figure, a sharp peak was observed at a retention time of ~23.25 min and this peak was assigned by measuring the chronogram with standard $As^{5+}$ solutions of different concentrations. For that, 1, 3 and 5 ppm of $As^{5+}$ solutions were purged to the IC column and chronogram was recorded correspondingly. In the chronogram, three peaks were observed with different intensity but at the same retention time. Therefore the peak observed at the retention time of ~23.25 min corresponds to $As^{5+}$ only. Further, the specificity of $As^{3+}$ response was studied in presence of different heavy metal ions. This was demonstrated by performing CV individually in presence of few heavy metal ions ($As^{5+}$, $Fe^{2+}$, $Cu^{2+}$, and $Mn^{2+}$) with same ERGO strip. In FIG. 3F-3I, there is no peak appeared in the voltammograms with each of the heavy metal ions. Thus, it concludes that ERGO3 shows electrochemical inertness to the aforementioned four metal ions in this potential window (−0.4 to +0.4 V). Although, there is an appearance of both oxidation (+0.25 to +0.4 V) and reduction peak (+0.17 V) of $Mn^{2+}$, however, the peak positions are different compared to $As^{3+}$ (+0.02 to 0.12 V). This is further verified with CA measurements in the following section.

CA measurements were performed by keeping the potential fixed in between +0.02 to +0.12 V and measurement was continued for 30 s in each CA scan. Before starting analytical measurements, the surface of the ERGO3 electrode was passivated by performing continuous CA cycles with PBS at the same potential and current was recorded simultaneously. For analysis purpose, the current value was chosen at 25 s in each chronogram. In FIG. 4A, initial ten data points are referred to the CA current measured with blank PBS using ERGO3 electrode, while next four cycles show the current response of 70 nA by the same electrode using 1 ppm of $As^{3+}$ spiked into the solution. In order to check that ERGO3 is exclusively responsible for $As^{5+}$ sensing, we carried out a control experiment by measuring the CA current of a bare metal strip with four individual heavy metal ions ($As^{5+}$, $Cu^{2+}$, $Fe^{2+}$, and $Mn^{2+}$) including $As^{3+}$ and the result is displayed in the inset of FIG. 4A. The concentration of each ion was maintained with 1 ppm. CA profile displays that bare metal strip did not exhibit any response with each of these heavy metal ions. Thus, it is confirmed that ERGO3 is only responsible for $As^{3+}$ sensing. Specific $As^{3+}$ response exhibited by the ERGO3 electrode was also tested by measuring CA current using four individual heavy metal ions ($As^{5+}$, $Cu^{2+}$, $Fe^{2+}$, and $Mn^{2+}$) of 1 ppm. The measurement was carried out at +0.02 to +0.12 V with 200 ppb of $As^{3+}$. Between two successive set of measurements with two interfering metal ions, $As^{3+}$ response was tested with the same electrode strip to study the repeatability of the specific response to $As^{3+}$ and the result is shown in FIG. 4B. Thus, ERGO3 exhibits the current response only with $As^{3+}$ and hence, ERGO3 is highly specific to $As^{3+}$. To determine the LOD of $As^{3+}$ response by the ERGO3 electrode, CA measurements were performed with various $As^{3+}$ concentrations within a range starting from 200 to 5 ppb. Same experiment was repeated thrice using the same strip and the results are shown in FIG. 4C. We calculated further statistical average of three sets of current for each concentration of $As^{3+}$ and plotted them as a function of $As^{3+}$ concentration as shown in FIG. 4D. It was seen that lower limit of the concentration that could be detected confidently was less than 10 ppb within a standard deviation of 5% and the experiment was highly reproducible for other strips also. Since ERGO3 is highly selective to $As^{3+}$ in PBS and thus it is needed to demonstrate the selectivity of ERGO3 in different field samples which were expected to be of different conductivity. Thus, the effect of solution conductivity was checked by CA measurements using PBS solutions of different conductivity with the same concentration of $As^{3+}$.

Figure 5:
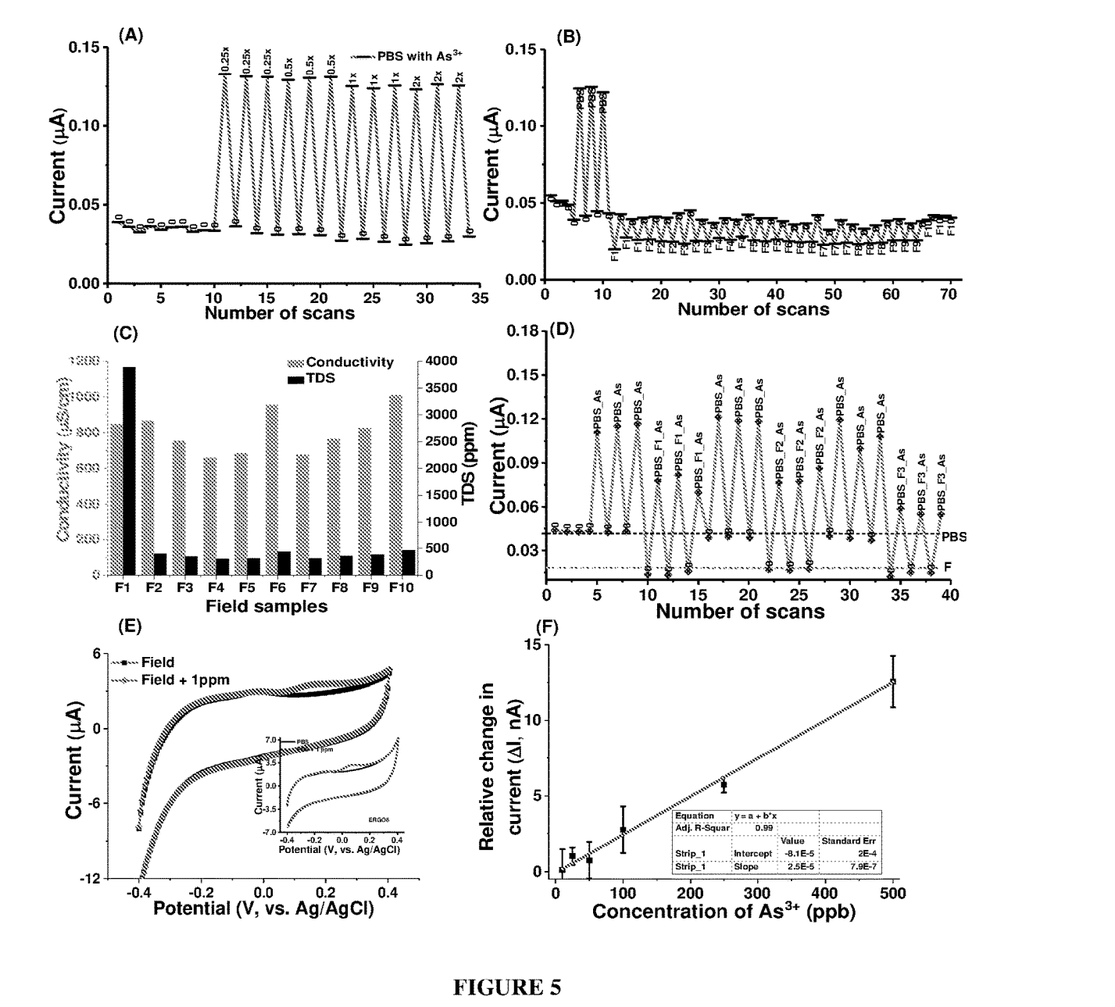
Figure 6:
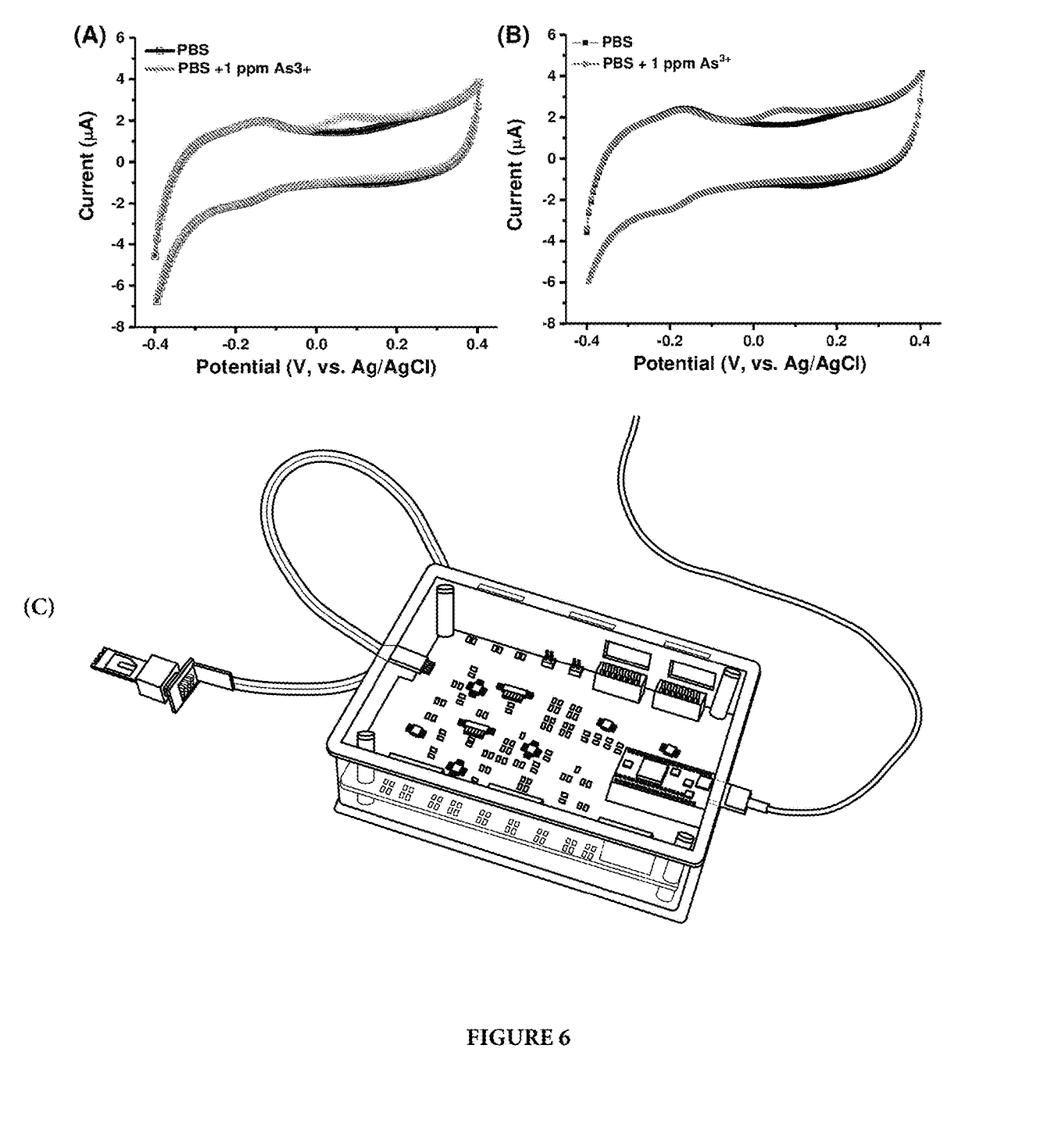
FIG. 6 CV with 1 ppm $As^{3+}$ using (A) as prepared ERGO3, (B) the same strip after 2 months, and (C) electrodes are connected with a commercial handheld ponetiostatic device.

Thus, PBS solutions of different conductivity were prepared by changing their ionic concentrations and used them further as electrolytes during CA measurements. Same experiment was repeated three times with each of the PBS solutions of different conductivity and 1 ppm of $As^{3+}$ was spiked simultaneously into the PBS solution during a CA scan. The results are shown in FIG. 5A. It was seen that CA current was almost constant even if we change the conductivity of the same solution by eightfold. Therefore, it confirms that ERGO3 strip can mimic the specific electrochemical response to $As^{3+}$ similar to the electrochemical activity of a redox enzyme (arsenite oxidase). In this context, we studied further the CA measurements with various field water samples which are presumably having different conductivity and TDS (total dissolved solids) level, and the corresponding chronogram is shown in FIG. 5B. All the field water samples which were used in CA measurements were collected from different locations of South 24 Parganas district of West Bengal, India. Before starting the CA measurements with field water samples, the total As concentration of all the water samples was measured by ICPMS and no As was found in those water samples. The current responses of all the field water samples were measured with respect to the current response of blank PBS. Before starting CA measurements with field water samples, $As^{3+}$ response was tested with ERGO3 strip for three scans followed by the same measurements performed with different field samples. It was seen that ERGO3 shows the negative current response in presence of field water samples with respect to the current response of blank PBS. But the amplitude of the current responses of all the field samples was almost equal, although there were differences in both conductivity and TDS among of them. Variation of TDS and conductivity of all the measured field samples is shown in FIG. 5C. A negative response by ERGO3 strips with field water samples was unforeseen and it is affected by the presence of some other ions (cations or anions) or molecules except a few cations ($As^{5+}$, $Cu^{2+}$, $Fe^{2+}$, and $Mn^{2+}$) which were tested previously during interference measurements. In addition, arsenic response of the ERGO3 strip was checked simultaneously in both PBS and field samples with spiking of 1 ppm $As^{3+}$ into these. The results are depicted in FIG. 5D. In both cases, $As^{3+}$ response was observed; however, the amplitude of the current response of $As^{3+}$ in field water sample is lower than the response in PBS alone. The decrease in response current with 1 ppm $As^{3+}$ in field sample with respect to $As^{3+}$ response in PBS, was also observed in the two voltammograms shown in FIG. 5E. Voltammogram of $As^{3+}$ response in PBS is shown in the inset of FIG. 5F. In both PBS and FWS (F1), $As^{3+}$ of 1 ppm was spiked into each of the solutions during voltammetry measurements and the peak position (~in between +0.02 to +0.12 V for PBS and +0.12 to +0.25 V for FWS) corresponding to arsenic response in the two voltammograms is different from each other. Furthermore, the LOD of $As^{3+}$ response was determined in field samples. FIG. 5F represents the linear variation of response current with different $As^{3+}$ dosages spiked into same field water and it is recognized that LOD of $As^{3+}$ in field water is 10-25 ppb. Both reusability and performance stability tests of the ERGO3 strips were checked for device application. For that, CV was performed with freshly prepared ERGO strips using 1 ppm $As^{3+}$ and same measurement was carried out with the same strip after two months. In this period, several electrochemical measurements were done with the same electrode. The results are shown in both FIGS. 6A and 6B. It showed that CVs are almost identical in both cases, which confirm the stability of the electrode's performance for reusability. Our ERGO electrode is used as a sensing platform and the electrochemical oxidation current of $As^{3+}$ by the electrode is recorded with any commercially available handheld potentiostat (for example, Rhodeostat) as shown in FIG. 6C.

Hence, in the present invention, we developed reusable ERGO (here, ERGO3) test strip which was optimized electronically through structural modification of it among other electrodes for highly selective and sensitive to $As^{3+}$.

Figure 7:
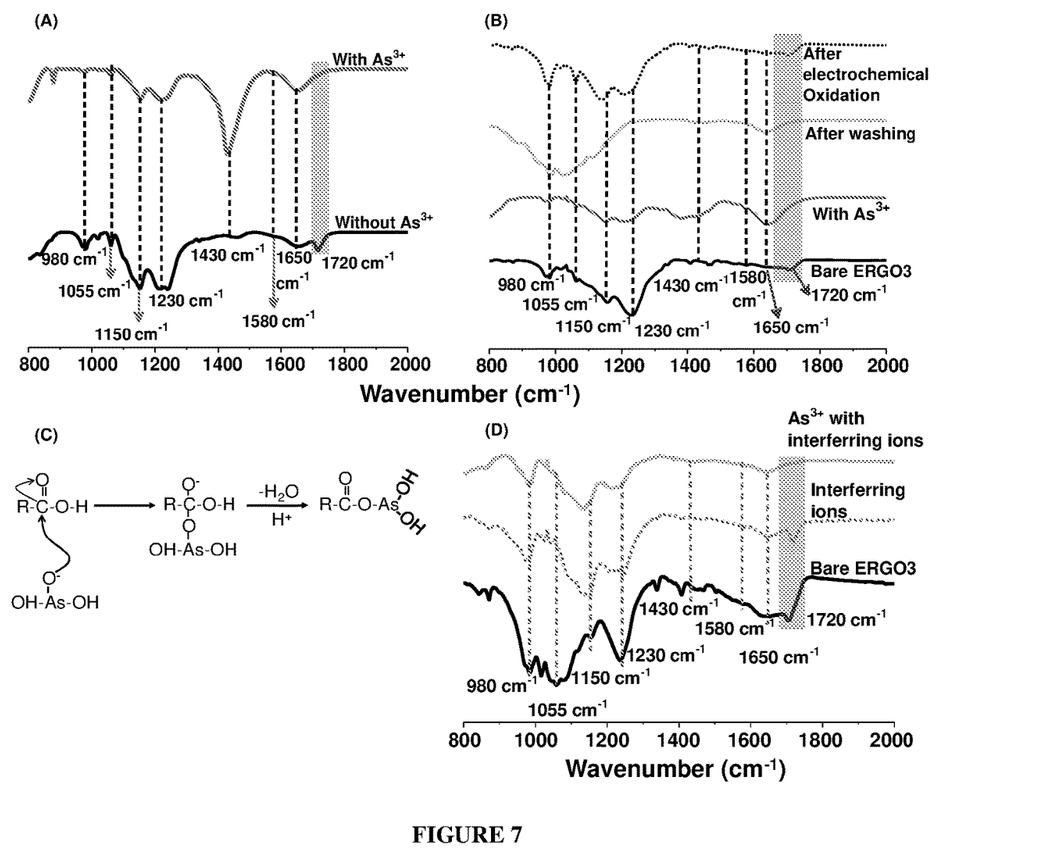
FIG. 7 FTIR spectra of ERGO3 (A) without (solid black trace) and with $As^{3+}$ (solid grey trace), (B) FTIR spectra of the same strip without $As^{3+}$ (solid black trace), with $As^{3+}$ (solid grey trace), after washing off it with DI water (solid light grey trace), and after electrochemical oxidation (black short dotted). (C) Proposed reaction mechanism involved with $As^{3+}$ adsorption on the surface of ERGO3. (D) FTIR spectra of bare ERGO3 electrode (black solid trace), the same electrode with a mixture of interfering ions (grey dotted trace) and interfering ions along with $As^{3+}$ (solid light grey trace).

Furthermore, we propose a sensing mechanism of ERGO3 electrode based on the IR spectroscopy results which are shown in FIG. 7. FTIR spectra shown in FIG. 7A were collected at ERGO3 with and without $As^{3+}$. To study the effect of $As^{3+}$ adsorption, we put 10 µL of 1000 ppm $As^{3+}$ solution on ERGO3 and dried the sample subsequently before IR spectroscopy measurements. Both the spectrum exhibited characteristics peaks of different functional groups. Some of them are in-plane of ERGO and rest of are out of the plane of ERGO sheets. FIG. 7A showed the characteristic bands related to C—O (epoxy at 950 $cm^{-1}$), C—O (alkoxy at 1055 $cm^{-1}$), C—O—C (at 1230 $cm^{-1}$), and C—OH (at 1430 $cm^{21}$) which are present generally along the edges of ERGO sheets. While C=O bonds in carboxylic acid and carbonyl moieties are present not only along the sheet edges but also on the plane of graphene sheets. The stretching vibration of C=O appears at 1720 $cm^{-1}$, while the C—O (epoxy) stretching vibration peak was observed at 980 $cm^{-1}$, and the C—O (alkoxy) stretching peak was at 1055 $cm^{-1}$. However, a small hump was noticed at 1580 $cm^{-1}$ which is due to the asymmetric stretching of $sp^2$ hybridized C=C [Acik, M., Lee, G., Mattevi, C., Pirkle, A., Wallace, R. M., Chhowalla, M., Cho, K., Chabal, Y. J. Phys. Chem. C 2011, 115, 19761-19781]. Both vibration and deformation peaks of O—H were observed at 3380 (not shown in FIG. 7A) and 1430 $cm^{-1}$, respectively. With $As^{3+}$ ($H_2AsO_3^{1-}$) exposure on the electrode, the peak intensity of O—H deformation peak was increased for both the electrodes. However, this peak was increased drastically in ERGO3 electrode. Increase of O—H deformation peak was attributed due to the binding of $H_2AsO_3^-$ moieties with ERGO3 electrode because of positive surface charges of ERGO3 favoured electrostatic interaction between the surface of ERGO3 and negatively charged $H_2AsO_3^-$ moieties. In addition, the stretching frequency of C=O is diminished selectively upon exposure of $As^{3+}$ to the ERGO3 electrode (solid grey trace of FIG. 7A)). Furthermore, we performed IR measurements with the same electrode strip as control experiments to confirm that $As^{3+}$ ions were bounded chemically with ERGO3 surface and those were not physisorbed on the surface. In the control experiments, we performed FTIR of bare ERGO3 strip and the same strip after different treatments with $As^{3+}$. The results are shown in FIG. 7B. In this Figure, it is seen that all the peaks (marked with dotted line) are unchanged except the two peaks at 1430 and 1720 $cm^{-1}$. Bare ERGO3 (solid black trace) shows possible vibration features of all bonds associated with functional groups of ERGO surface. But upon exposure of $As^{3+}$ (solid grey trace, 1720 $cm^{-1}$ feature has vanished from the spectrum (highlighted with grey box) and peak at 1430 $cm^{-1}$ appears concurrently. This result is consistent with FIG. 7A. The disappearance of 1720 $cm^{-1}$ is explained by the nucleophilic reaction of $H_2AsO_3^{-1}$ moieties to the C=O bonds of COOH groups of ERGO3. The reaction mechanism which is involved with the disappearance of the C=O feature upon exposure of $As^{3+}$ has been shown in FIG. 7C. After vigorous washing of the same strips with DI water, we performed IR measurements further with the same electrode and the spectrum is displayed in FIG. 7B (solid light grey trace). We observe that all the major peaks remain the same but there is a slight decrease in intensity. Nevertheless, the peak at 1430 $cm^{-1}$ remains unchanged and the peak at 1720 $cm^{-1}$ is still disappeared. However, after electrochemical oxidation at a potential in between +0.1 to +0.25 V, the IR spectrum (black dotted trace) exhibits same spectral feature as of bare ERGO3. This results in the disappearance of C—OH stretching frequency, while the resonance frequency of the C—O bond appears in the same spectrum. In this process, $As^{3+}$ ions which were adsorbed or bonded to the surface of ERGO3 were released subsequently into the solution as oxidized species ($HAsO_4^{2-}$) after application of a potential to the same strip. We further studied the interaction of other interfering ions with ERGO3 electrode and the spectra are shown in FIG. 7D. It is seen that there is no quenching of the C=O peak upon exposure of interfering ions. Hence, we can infer that there is no nucleophilic interaction of other ions with ERGO3 electrode and therefore there is no change in the spectral feature of ERGO3 in presence of interfering ions. But, in presence of $As^{3+}$ along with interfering ions, C=O peak disappears while C—OH becomes visible consequently. Hence, these IR results confirm selective adsorption of $As^{3+}$ on the surface of ERGO3 and released from the surface after application of potential at the electrode.

It may be appreciated by those skilled in the art that the drawings, examples and detailed description herein are to be regarded in an illustrative rather than a restrictive manner.

We claim:

1. A point-of-care (POC) chronoamperometry device for selective arsenite (As3+) sensing, said device comprises, a reusable bio-mimic "electrode test strip made" of electrochemically reduced graphene oxide (ERGO) grown by electroreduction of graphene oxide (GO) on a metallic thin film coated flexible substrate, wherein,
the electrical conductivity of the ERGO surface is modified to obtain selectivity for As3+ by electrochemical reduction of GO at a low DC potential in the range of greater than 0 to −1.5 V at an electrode for greater than 0 to 8 hours,
wherein, said device selectively detects As3+ in field water samples upon applying a fixed potential of +0.1 to +0.25 V in a pH range of 6-9 and is independent of conductivity and TDS levels in the water samples.

2. The device as claimed in claim 1, wherein the bio-mimic ERGO electrode is grown by controlling the electrical conductivity of ERGO by electro-reduction of graphene oxide (GO) film.

3. The device as claimed in claim 1, wherein the ERGO is configured as an active electrode for use as a chronoamperometry based As3+ sensing platform.

4. The device as claimed in claim 1, wherein the flexible substrate is polyethylene terephthalate (PET).

5. The device as claimed in claim 1, wherein the detection is independent of conductivity and TDS levels in water and As3+ is selectively detected in field water samples even in the conductivity range of 650-1000 pS/cm and TDS range of 500-4000 ppm.

6. The device as claimed in claim 1, wherein the ERGO strip is a reusable bio-mimic electrode test strip and is reusable for 10 times.

7. The device as claimed in claim 1, wherein the "ERGO electrodes" of the bio-mimic electrode test strip show high electrochemical stability even when used at high temperatures of 45° C. and humidity of 80% RH for one month.

8. The device as claimed in claim 1, wherein the limit of detection (LOD) of As3+ in field samples is less than 25 ppb.

9. The device as claimed in claim 1, wherein surface defects on sp carbons of the basal plane of a monolayer reduced graphene oxide act as active sites for As3+ oxidation.

10. The device as claimed in claim 1, wherein the flexible substrate is coated with metallic thin film selected from Ag, Au, Pt or their alloys.

* * * * *